Figure 1:
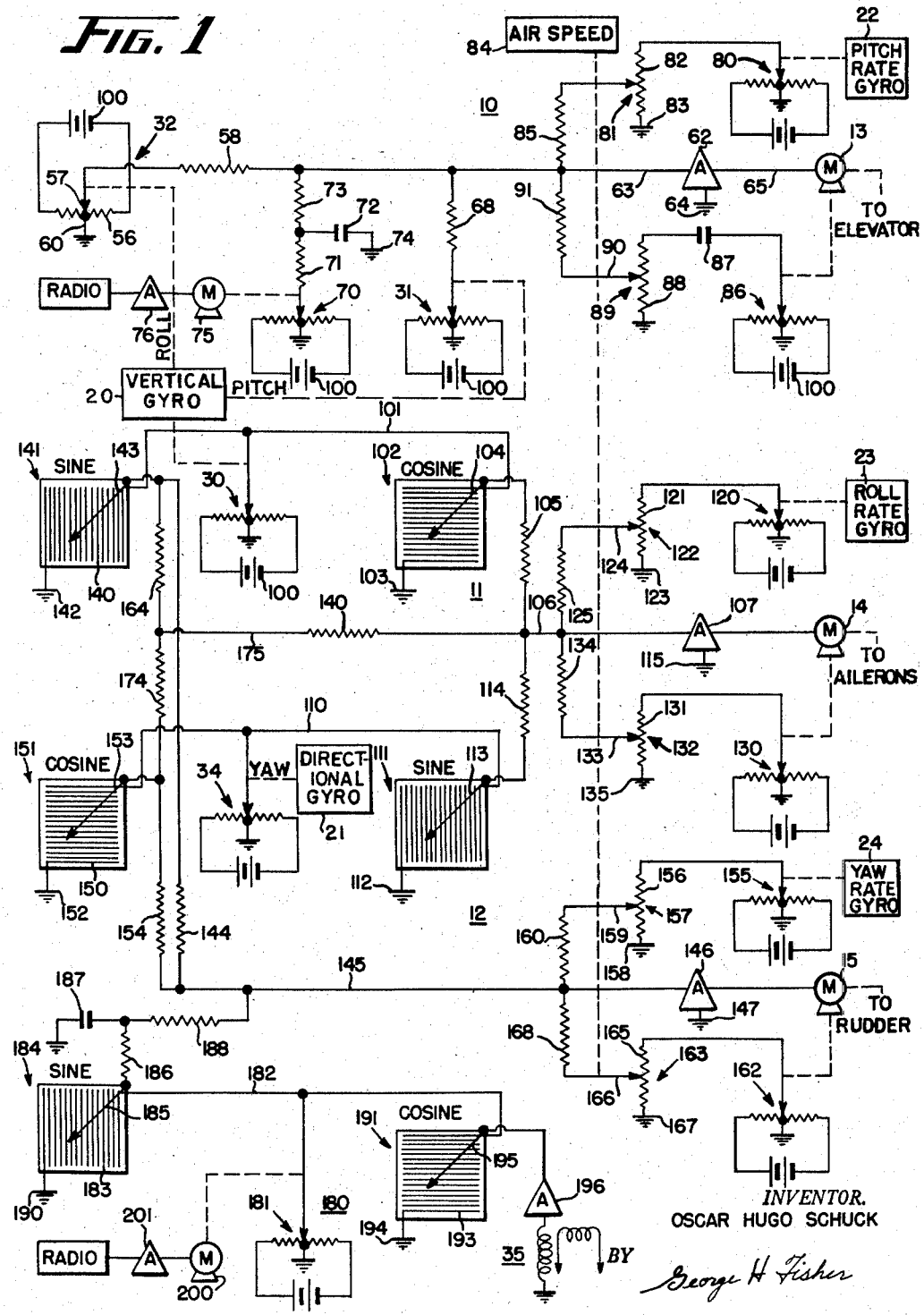

May 19, 1959     O. H. SCHUCK     2,887,285
AUTOMATIC PILOT APPARATUS FOR CONVERTIBLE AIRCRAFT
Filed Feb. 8, 1954     2 Sheets-Sheet 2

INVENTOR.
OSCAR HUGO SCHUCK
BY
George H Fisher
ATTORNEY

United States Patent Office 2,887,285
Patented May 19, 1959

2,887,285

AUTOMATIC PILOT APPARATUS FOR CONVERTIBLE AIRCRAFT

Oscar Hugo Schuck, Minneapolis, Minn., assignor to Minneapolis-Honeywell Regulator Company, Minneapolis, Minn., a corporation of Delaware Application February 8, 1954, Serial No. 408,837

11 Claims. (Cl. 244—77)

My invention relates to an automatic pilot or steering apparatus for aircraft and more particularly to apparatus for controlling the flight of an aircraft having a conventional thrust apparatus and which takes off and lands with its longitudinal and thrust axes in other than normal flight attitude. Aircraft of this type are relatively new in the field of aeronautics and present new problems in the field of flight control. This type of aircraft is presently identified as the "convertible" aircraft or Convertoplane and is characterized by the fact that it takes off and lands in a substantially vertical plane and yet has the speed and maneuverability identified with conventional craft in approximately level flight attitudes. The specific type of convertible aircraft toward which this automatic pilot is most applicable is that which has the conventional fuselage, wings and thrust apparatus and takes off from a vertically oriented position in which it is supported on or near its tail section and lands in the same manner, such that the take-off and landing is accomplished in a substantially vertical direction with lift being provided by the thrust mechanism such as a propeller. Once in the air after leaving the ground on take-off this type of aircraft is tilted to a normal or conventional level flight attitude, this change in attitude being brought about through the medium of change in position of the aircraft control surfaces. In landing, the aircraft attitude change from level flight to the inclined position is accomplished in the same manner. In this particular type of convertible aircraft the thrust line of the thrust apparatus remains fixed with respect to the aircraft fuselage. The problem of automatically stabilizing this type of aircraft during such operation lies in the fact that stabilizers, such as gyroscopes, must have some type of memory or reference apparatus associated therewith and because the aircraft is to change attitude with respect to the earth some compensation by way of reference position change is necessitated in order to stabilize the flight of the craft during this attitude change. Coexistent with this problem is also the fact that in at least two flight axes a stabilizer referenced for one flight attitude will not sense displacement about the axis of the craft with which it is normally associated when the craft attitude is changed 90 degrees from the reference position and its ability to sense this attitude change will be diminished as a function of the angular displacement of the craft from the reference position. Thus, control apparatus such as servomotors connected to the sensing and stabilizing devices under these conditions will not be effective to stabilize aircraft flight.

In the present invention, the gyroscopes or sensing devices for the automatic pilot apparatus are mounted on a platform which is pivoted for movement about the pitch axis of the aircraft in making transitions from approximately level flight attitudes to the take-off and landing flight attitudes. This platform is positioned parallel to the earth's surface and is inclined to the longitudinal axis of the aircraft with the vertical gyro referenced to a vertical position and the directional gyro referenced to a heading in the plane of the platform. Under vertical take-off and landing circumstances the directional gyro will thus sense roll instead of yaw of the aircraft and the roll axis of the vertical gyroscope will sense yaw instead of roll of the aircraft. At points in between vertical and level flight and with the platform still in the same position in space but moved relative to the longitudinal axis of the craft by virture of a motor driving apparatus, yaw and roll sensing devices will each sense appropriate amounts of aircraft roll and yaw until in level flight the roll sensing devices sense only roll and the yaw sensing devices sense only yaw displacements. The called-for aircraft attitude during transition from take-off to level flight or from level flight to landing under these circumstances is determined by the angle between the longitudinal axis of the aircraft and the reference platform. In the present invention both the yaw and roll signal generating devices are each connected to the aileron and rudder servomotors and signal multiplying or modifying devices are included in the respective circuits to both servomotors to proportion the amount of signal to be fed to the respective motors in proportion to the ability of the sensing devices to sense displacement about the axis which the respective motors control. Similarly, provision is made for stabilized turn control for these various flight attitudes in which the turn signal is fed directly to the rudder servomotor in the vertical attitude and by means of precession of the directional gyroscope and the yaw signal generator in level flight with proportioned amounts of signal to each of these devices for intermediate flight positions. Pitch attitude change, since it is directly sensed, will be controlled by the pitch signal generator and the aircraft will be moved between vertical and level flight by means of displacement of the platform upon which the gyroscopes or displacement sensing devices are mounted.

Therefore, it will be seen that it is an object of this invention to provide an automatic pilot apparatus for a new type of aircraft such as a Convertoplane.

It is also an object of this invention to provide an improved automatic pilot apparatus which will stabilize an aircraft for a plurality of flight operating attitudes.

It is another object of this invention to provide an improved automatic pilot apparatus for an aircraft in which the sensing devices with single reference positions stabilize the flight attitude of the aircraft through a plurality of positions.

Another object of this invention is to provide an improved automatic pilot apparatus which varies the authority of various sensing devices in controlling associated control surface actuators in proportion to the ability of the sensing devices to sense displacement of the aircraft about the axis which the associated servomotors control.

Still another object of this invention is to provide an improved automatic pilot apparatus of this type with a stabilized turn control.

Figure 2:
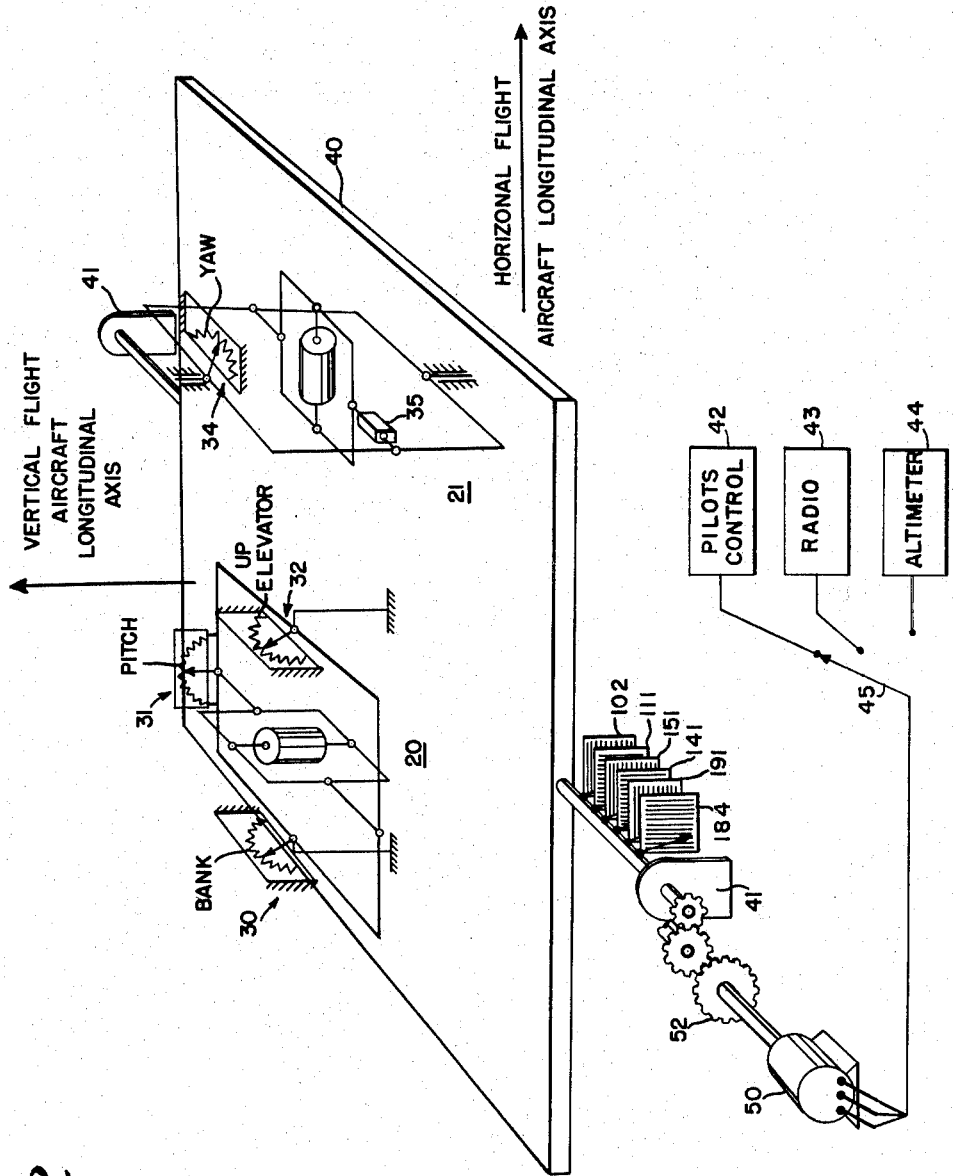

A still further object of this invention is to provide in an automatic pilot apparatus an arrangement by means of which a single set of sensing devices may be utilized to stabilize an aircraft in a plurality of reference positions. These and other objects of this invention will become apparent from a reading of the attached description together with the drawings wherein:

Figure 1 is a schematic circuit diagram of my improved automatic pilot apparatus, and Figure 2 is a schematic view of a platform mounting the gyroscopes and sine and cosine generators for the improved automatic pilot apparatus.

My improved automatic apparatus is disclosed as a three-channel automatic pilot adapted to control elevator, aileron and rudder servomotors and hence the control surfaces of an aircraft. The elevator channel has been designated by the numeral 10, the aileron channel by the numeral 11 and the rudder channel by the numeral 12. Associated with each channel of the autopilot are servo-motors 13, 14 and 15 respectively for controlling the elevator, aileron and rudder control surfaces. This automatic pilot apparatus is further disclosed as utilizing direct current type networks. As it will be later seen, the aileron and rudder channels of the automatic pilot are interconnected. This automatic pilot apparatus utilizes conventional stabilizing devices of gyroscopes which are shown only schematically or in block form, the vertical gyroscope being identified by the number 20 and the directional gyroscope by the numeral 21. Similarly, the autopilot employs rate gyroscopes in the pitch, roll and yaw axes identified by the numerals 22—24 respectively. All of the gyroscope units or stabilizers are conventional devices, the vertical gyroscope having associated therewith roll and pitch potentiometers 30 and 31, and an up elevator potentiometer 32 and with suitable erection mechanism and gravity sensing control, which are not shown, to provide for maintaining the spin axis of the gyroscope vertical. Similarly, the directional gyroscope 21 has associated therewith a yaw signal generator or potentiometer 34 and a precession motor indicated at 35 for precessing the directional gyroscope about the yaw axis. It will be understood, although it is not specifically shown, that suitable means are provided for maintaining the spin axis of the directional gyroscope in a substantially horizontal plane.

As noted above this automatic pilot apparatus is designed to stabilize aircraft in a number of attitudes from take-off and landing positions to level flight where the take-off and landing position is normally 90 degrees displaced from the level flight attitude and through intermediate positions between take-off and landing and/or landing and level flight attitudes.

In Figure 2 there is shown a platform indicated generally by numeral 40 which mounts the vertical 20 and directional 21 gyroscopes. This platform is pivoted to a suitable supporting structure 41 and is adapted to be positioned in the aircraft such that the supporting structure pivots the platform about the pitch axis of the aircraft. The gyroscopes are so positioned that the spin axis of the directional gyroscope will be parallel to the platform and the spin axis of the vertical gyroscope will be normal thereto. In the normal take-off or landing attitudes, the platform will be positioned in the aircraft such as to be substantially normal to the longitudinal axis of the craft, as indicated by the "vertical flight" arrow in Figure 2. Under these circumstances, the spin axis of the vertical gyroscope will be parallel with the longitudinal axis of the aircraft and the spin axis of the directional gyroscope will be normal thereto. In level flight attitudes the platform will be positioned substantially parallel to the longitudinal axis of the aircraft; the spin axis of the vertical gyroscope will be normal to the longitudinal axis of the aircraft and the spin axis of the directional gyroscope will be parallel thereto. Associated with the pivoting and mounting structure 41 of the platform 40 is a plurality of sine and cosine potentiometers identified by the numerals 102, 111, 141, 151, 184 and 191, each of these having, as will be later described, wipers which are operated by the shafts of the supporting structure of the platform to displace the wipers relative to the fixed portions of the potentiometers adapted to be attached to the aircraft. Also associated with the platform is a driving motor indicated at 50 connected to the shaft through suitable gearing indicated at 52. Circuitries of the devices associated with the platform are omitted in Figure 2 for simplicity inasmuch as it was shown in detail in Figure 1. It should also be noted that while I have utilized sine and cosine potentiometers which are conventional herein, electromagnetic signal generators or other types of resolvers could be utilized herein. Motor 50 is designed to tilt platform 40 relative to the longitudinal axis of the aircraft or about the pitch axis thereof during the take-off and landing operation such that the aircraft will be stabilized by the sensing devices mounted thereon in the various flight attitudes between and at the take-off and landing attitudes and the level flight attitude. The motor 50 is adapted to be driven or controllably energized through suitable means to be later defined.

Referring now to Figure 1 and the elevator channel in the autopilot, it will be seen that the control network therefor is of the D.C. type utilizing parallel summing type of connections. The up-elevator potentiometer 32 comprises a winding 56 and a wiper 57, the winding 56 being energized from a direct current source of power 100 which is connected to the extremities of the winding and the wiper 57 being connected through a summing resistor 58 to the remaining components of the elevator network. Winding 56 is center tapped and grounded as at 60 and the wiper 57 thereof is operated by the roll axis gimbal of the vertical gyroscope 20. It should be noted here that all of the signal generators of the autopilot apparatus are of the same type, being energized from a direct current source of power and having a center-tapped winding which is grounded for purposes of completing the energizing circuit to an amplifier associated therewith. Servomotor 13 of the elevator channel is controllably energized by an amplifier indicated at 62 having an input conductor 63 and a grounded input conductor 64, the amplifier controlling the energization of motor 13 through suitable electrical connections indicated schematically at 65. The amplifier and servomotor may be of the D.C. type or A.C. type and are conventional such that the details are not included herein. Also included in the elevator control circuit channel is the vertical gyroscope pitch potentiometer 31 having a winding and wiper associated therewith, the wiper being connected through a summing resistor 68 to the input conductor 63 of amplifier 62. This wiper is operated by the gimbal associated with the pitch axis of the vertical gyroscope 20. The pitch axis potentiometer, like each of the remaining potentiometers, is energized from the direct current source 100, the circuit being completed through the amplifier by means of a grounded center tap on the pitch axis potentiometer winding. Also in parallel with the above-named controls is a pitch control potentiometer 70 including an associated winding and wiper with the same energization circuit referred to above, the wiper being connected through a filter comprising a resistor 71 and a capacitor 72 to a summing resistor 73 connected to the input conductor 63 of amplifier 62. The filter capacitor 72 is grounded as at 74 for noise shielding purposes. The wiper of the pitch control potentiometer is adapted to be operated by a motor indicated at 75 which is controllably energized through an amplifier 76, the amplifier being of the type that it may be operated by radio signals for remote control purposes. In the event that pitch control is to be maintained by the pilot, the motor and amplifier may be omitted and the wiper manually adjusted in the cockpit. Should the pitch control be operated by the remote operator, it will be operated by means of radio signals from a ground transmitting unit. Such details, however, are conventional and consequently they are eliminated here for simplicity. Also included in the elevator channel is the rate gyroscope 22 designed to sense pitch rate of the aircraft and mounted on the aircraft remote from the platform 40. This unit has associated therewith a signal generator in the form of a potentiometer 80 which is energized from a D.C. source and has a grounded center-tapped winding. The wiper thereof is connected to winding 82 of a ratio potentiometer 81 whose wiper is actuated by an airspeed responsive device 84. The winding 82 is grounded as at 83 to provide a multiplying arrangement between the rate gyroscope potentiometer and a summing resistor 85 to which the wiper of the ratio potentiometer is connected. The summing resistor is in turn connected to the input lead 63 of amplifier 62. Servomotor 13 of the elevator channel has associated therewith a servo balance potentiometer indicated at 86 which is energized in the same manner as the previously described potentiometers and has its wiper actuated by the output shaft of the servomotor. Connected in series with the wiper of the servo balance potentiometer 86 is a capacitor 87 leading to a winding 88 of a ratio potentiometer 89 having a wiper 90 operated by the airspeed responsive device 84. The wiper 90 is also connected through a summing resistor 91 to the input lead 63 of the amplifier 62. The capacitor input into the ratio potentiometer from the servo balance potentiometer provides a rate type follow-up in which the full signal changes from the servo balance potentiometer are immediately applied to the ratio potentiometer, but in which the steady-state signals are blocked. Further, by modifying the amount of signal fed back through the ratio potentiometer as a function of air speed the feedback circuit or balance circuit is stabilized for high and low airspeeds.

True pitch attitude of the aircraft for the various flight conditions between take-off and level flight or landing is indicated by the following formula:

$$\theta = \theta' + A$$

where $\theta$ is the pitch angle of the aircraft with respect to the true horizontal, $\theta'$ is the gyro pitch axis referred to the platform and $A$ is the angle between the platform and the longitudinal axis of the aircraft. Where the pitch attitude for take-off position is vertical or substantially vertical, the platform will be positioned 90 degrees thereto and the angle $A$ will be 90 degrees. In level flight, the angle $A$ will be zero and hence the gyro pitch angle will be the same as the pitch angle of the aircraft. To maintain or control pitch attitude between take-off and level flight or during turn-over and upon starting, the motor 50 is driven or controllably energized to tilt the platform 40 relative to the longitudinal axis of the aircraft. Control of motor 50 driving the platform can be by the pilot through a suitable control 42; it can be by radio, through suitable apparatus 43 operated either at the discretion of a remote operator or at a predetermined rate initiated by the remote operator, or by means of a timing or sequencing mechanism within the aircraft; or by means of an altimeter 44 within the aircraft. Suitable means 45 are provided for switching control of motor 50 between the devices 42, 43, and 44. As the platform is tilted, a pitch signal will be fed to the elevator amplifier to operate the servomotor causing the elevator control surface to displace the aircraft and position the same in pitch such that the inner gimbal mounting the controller for the pitch axis signal generator will remain in a substantially neutral position. That is to say that the elevator channel will be energized by virtue of a signal from the pitch axis potentiometer 31 which signal will be balanced in part by the pitch rate gyro signal potentiometer 80 and the servo balance potentiometer 86. However, it should be noted that at relatively low speeds in take-off, the airspeed controller adjusts the ratio from these two potentiometers to a relatively low rate and consequently the balancing and pitch rate signals will be substantially low for balancing purposes and the main follow-up will be obtained primarily through displacement of the aircraft relative to the gimbal of the vertical gyro in space. In the landing procedure, the operation of the pitch axis potentiometer 31 and the pitch rate gyro and servo balance potentiometer 86 is substantially the same, the aircraft going from a level flight to the nose-up attitude. In the level flight conditions, the elevator operation is for the most part conventional. The up elevator controller 32 adds an input signal during turns of the aircraft to provide for an up elevator operation thereby preventing loss of altitude in turns.

Similarly, displacement of the aircraft about the pitch axis in level flight will operate the pitch axis potentiometer 31 in a manner similar to that described in connection with take-off and landing causing operation of the elevator servo-motor and displacement of the elevator control surface. In level flight, however, the airspeed controller will for the most part be registering a higher airspeed and consequently the proportionately larger amount of control signal from the rate gyro potentiometer and servo balance potentiometer will be fed to the input circuit of the amplifier 62 through the parallel summing circuits. The capacitor in series with the servo balance potentiometer wiper operates to delay full balance signal initially and provides for a rate type of feedback from the servo balance potentiometer. Should it be desired to control the operation of the aircraft in pitch from a remote point or by remote control in the aircraft, the motor driven potentiometer 70 or pitch controller will be operated to supply a signal to the summing resistor 73 energizing the amplifier and hence the motor 13 in the manner similar to the pitch axis potentiometer. Where remote control is not utilized, the amplifier 76 and motor 75 for the most part may be eliminated.

The aileron and rudder channels of the autopilot, 11 and 12 respectively, are interconnected for reasons indicated above and which will be more fully explained as the disclosure proceeds. By mounting the gyroscopes 20 and 21 on the platform 40 as indicated above, the control range of the autopilot provides for maneuverability in either horizontal or vertical flight. During vertical flight the aileron axis is controlled through the directional gyroscope and the rudder axis is controlled from the vertical gyroscope. During turn-over, that is the change in flight attitude from vertical to level flight on take-off or landing, these controls change as a function of the angle $A$, that is the angle between the platform and the longitudinal axis of the craft according to the following equations:

$$\phi = \phi' \cos A + \psi' \sin A$$
$$\psi = \psi' \cos A + \phi' \sin A$$

where $\phi$ is the roll angle referred to the aircraft, $\psi$ is the yaw angle referred to the aircraft, $\phi'$ is the gyro roll angle referred to the platform and $\psi'$ is the gyro yaw angle referred to the platform. The necessary sine and cosine multiplications to resolve these formulae are carried out by passing the signal of interest through a card potentiometer or resolver having sine and cosine characteristics, these signal modifiers being attached to the platform to be operated as a function of the displacement of the platform.

Considering now the aileron channel 11 it will be seen that the vertical gyroscope 20 has the roll potentiometer 30 associated therewith which potentiometer is energized in the same manner as the signal generators of the elevator channel. That is to say the winding of the roll potentiometer 30 is connected to the direct current source and is center tapped and grounded. The wiper of the roll potentiometer 30 is connected by means of a conductor 101 to one extremity of the winding of a first cosine potentiometer indicated at 102 whose opposite extremity is grounded as at 103. The cosine potentiometer has a wiper 104 associated therewith which is connected through a summing resistor 105 to an in lead 106 of an amplifier 107 associated with and controlling the energization of servomotor 14 which in turn operates the aileron control surface of the aircraft. Thus, the signal from the roll potentiometer is multiplied or modified by the action of the cosine potentiometer and the joint output is impressed across the summing resistor of the parallel summing circuit of the aileron channel of the autopilot. Directional gyro 21 has the yaw signal generator or potentiometer 34 associated therewith which is energized in a similar manner and connected by means of a conductor 110 to a sine potentiometer or resolver 111 having a grounded extremity 112 and a wiper 113 associated therewith which wiper is connected by a summing resistor 114 to the in lead 106 of amplifier 107. Amplifier 107 is also grounded as at 115 to complete the circuit to the grounded center taps of the respective roll and yaw signal potentiometers 30 and 34 respectively and the grounded connections of the sine and cosine potentiometers. In addition to the above, the aileron channel includes the rate gyro 23 and an associated signal potentiometer 120 having a winding and wiper and energized in a manner similar to the remaining signal generating devices of the disclosure. The wiper of the signal generator 120 is connected to one extremity of a winding 121 of a ratio potentiometer 122 whose other extremity is grounded as at 123. A wiper 124 of the ratio potentiometer is connected to the summing resistor 125 and thence to the in lead 106 of amplifier 107, the wiper 124 being operated by an airspeed controller 84. Associated with motor 14 operating the aileron control surfaces is a servo balance potentiometer 130 whose wiper is operated by movement of the output shaft of the servomotor and which is connected to ratio potentiometer 132 at one extremity of its winding 131, the ratio potentiometer having a wiper 133 which is connected through a summing resistor 134 to the input lead 106 of amplifier 107. Winding 131 is grounded as at 135 to complete the servo balance circuit to the amplifier. Further, the wiper 133 is operated by the airspeed controller 84 in a manner similar to that described in connection with the elevator channel. Thus, at low airspeeds the ratio of the roll rate signal and the roll servo balance signal will be low in comparison to the outputs of these devices at high airspeeds and the effect of the balancing potentiometer 130 in balancing the aileron control channel will be modified or quite limited under low airspeed conditions. In addition to the above, there is also included in connection with the aileron channel, a coupling circuit to be later identified and described, this coupling circuit including the dropping resistance 140 which is connected to the input lead 106 of the amplifier.

The rudder channel 12 of the autopilot also includes the roll potentiometer 30 of the vertical gyroscope 20 and the yaw potentiometer 34 of the directional gyroscope 21. The wiper of the roll potentiometer 30 is connected to the lead 101 which is connected to a winding 140 of a sine potentiometer 141 the opposite extremity of the winding being grounded as at 142 and the sine potentiometer having a wiper 143 which is connected through a summing resistor 144 to an input lead 145 of an amplifier 146 controlling the energization of the rudder servomotor 15. The amplifier 146 has a second input lead grounded as at 147. The wiper of the yaw potentiometer 34 is connected through the conductor 110 to a winding 150 of a cosine potentiometer 151 with the opposite extremity of the winding 150 being grounded as at 152. The cosine potentiometer 151 has a wiper 153 associated therewith which is connected through a summing resistor 154 to the in lead 145 leading to the amplifier 146 of the rudder channel of the autopilot. Also connected to wipers 143 and 153 respectively are summing resistors 164 and 174 which are connected through a conductor 175 leading to the dropping resistor 140. As will be later described, this portion of the circuit is the coupling circuit which couples the rudder and aileron portions of the autopilot. In addition to the above, the rudder channel also includes a potentiometer 155 operated by the yaw rate gyroscope 24, the wiper of the yaw rate signal potentiometer being connected to one extremity of a winding 156 of a ratio potentiometer 157 whose opposite extremity is grounded as at 158 and which has a wiper 159 operated by airspeed device 84. The wiper 159 is connected through a summing resistor 160 to the input lead 145 of amplifier 146. Similarly, motor 15 has associated therewith a servo balance potentiometer indicated generally at 162 whose wiper is connected to a ratio potentiometer 163 having a winding 165 and a wiper 166, the wiper being connected to one extremity of the winding 165 whose opposite extremity is grounded as at 167 and whose wiper 166 is connected through a summing resistor 168 to the input lead 145 of amplifier 146. As in the aileron and elevator channels, the airspeed controller 84 operates the wiper 166 of the ratio potentiometer 163 as well as the wiper 159 of the ratio potentiometer 157 associated with the yaw rate gyroscope.

In adidtion to the above, the rudder channel of the autopilot and hence the aileron channel by virtue of the coupling circuit has associated therewith a turn control indicated generally at 180 and employing a signal generator indicated at 181 which is energized in the same manner as the other signal generators and potentiometers of the autopilot. It is shown as a potentiometer whose wiper is connected by virtue of a conductor 182 to a winding 183 of a sine potentiometer 184 having a wiper 185 which in turn is connected through a filter resistor 186 and a capacitor 187 to a summing resistor 188 and thence to the in lead 145 of amplifier 146. The opposite extremity of the winding 183 of sine potentiometer 184 is grounded as at 190 to complete the circuit in the conventional manner. The signal from the turn potentiometer 181 is also fed through the conductor 182 to a cosine potentiometer indicated at 191, the lead 182 being connected to its winding 193 whose opposite extremity is grounded as at 194 and which has a wiper 195 associated therewith, the wiper in turn being connected to an amplifier 196 controlling the energization of the precession motor 35 of the directional gyroscope 21.

The turn control potentiometer 181 of the turn control is adapted to be operated through a motor 200 energized by an amplifier 201 whose output in turn is controlled by radio signals if it is desired to operate the turn control from a remote point, or the wiper of the potentiometer 181 may be manually operated (not shown) if it is desired to operate the same from the cockpit of the aircraft.

In considering the operation of the autopilot network, it will first be assumed that a condition of level flight is maintained. Under these circumstances, the platform 40 mounting the gyroscopes 20 and 21 will be in the plane of the longitudinal axis of the aircraft and the elevator channel of the autopilot will be as described above. The pitch axis signal generator 31 of the vertical gyroscope will be the prime controller in maintaining level flight and the signals from the rate gyro and servo balance potentiometers will serve to restore the aircraft to level flight in a smooth stable type of operation should it depart therefrom. Stabilized displacement of the aircraft in pitch will be controlled by means of the pitch controller 70 which may be manually or remotely operated to feed a signal into the parallel summing network through the summing resistor 73 unbalancing the amplifier 62 and operating the motor 13 to displace the elevator control surface in a desired manner. As noted above the up elevator potentiometer 32 serves only to introduce a signal to the elevator channel during turns of the aircraft to provide for up elevator control in a conventional manner.

The aileron and rudder channels 11 and 12 respectively of the autopilot should be considered together in view of their interconnection. With the assumption of the level flight attitude, it should be noted that the angle A between the platform and the longitudinal axis of the aircraft will be zero. Consequently the sine potentiometers will have a zero output and signals fed to the same from the roll and yaw signal generators 30 and 34 respectively will not pass therethrough. The cosine generators or potentiometers will be so displaced that their mulitplying ratio will be one and consequently the signals from the roll and yaw signal generators of the vertical and directional gyroscopes respectively will be directed to the aileron and rudder channels respectively through their associated summing resistors. Thus for the aileron channel, the signals from the vertical gyroscope roll signal generator 30 will be connected through the cosine potentiometer 102 to the summing resistor 105 to energize the amplifier 107 and operate the motor 14 in the event the aircraft deviates from the reference attitude in roll. The rate gyro signal potentiometer 122 and the servo balance potentiometer 130 will supply signals upon displacement of the aircraft and control surfaces respectively to balance the input signal to the amplifier 107 and restore the aircraft through operation of the aileron control surface to the predetermined flight position. At high airspeeds the airspeed device 84 adjusts the ratio potentiometers 122 and 132 respectively such that substantially full signal from the rate gyro potentiometer 120 and servo balance potentiometer 130 is attained. For the rudder channel 12 of the autopilot, the primary controller will be the yaw signal generator 34 which will be connected through the cosine potentiometer 151 with a multiplying ratio of one to the summing resistor 154 and to the input 145 of amplifier 146 causing the motor 15 to be energized and operate the rudder control surface of the aircraft. The rate gyro potentiometer 155 and the servo balance potentiometer 162 associated with this channel operate in a similar manner to restore the balance in a stable operation. The airspeed ratio controller functions also in a similar manner to proportion the amount of signal fed from the yaw rate gyro potentiometer 155 and servo balance potentiometer 162 in proportion to the airspeed. The intercoupling between the yaw and roll or aileron and rudder channels through the summing resistors 164, 174 and the dropping resistor 140 are included herein merely to indicate that some type of coupling between the rudder and aileron channels is required for most aircraft in order to provide for coordinated recovery of the aircraft. Thus a displacement of the yaw sensing device will feed a signal not only to the rudder channel but the aileron channel through the coupling circuit, and the proportionate amounts of intercoupling will be preset and governed primarily upon characteristics of the aircraft. Similarly a roll displacement of the aircraft will be recovered by a coordinated turning operation resulting from the coupling circuit between the aileron and rudder channels. Also in the level flight attitude, the turn control, whether initiated from a remote point or from the cockpit, through the turn control potentiometer 181 will be fed through the cosine generator or potentiometer 191 to the amplifier 196 energizing the directional gyro precession motor and causing precession of the directional gyroscope about the yaw axis thereby displacing the signal generator 34 associated therewith to feed the rudder and aileron channels of the autopilot in the manner described above. Inasmuch as the sine generator will have a zero multiplying factor, no signal will be fed directly to the rudder channel through the summing resistor 188.

Considering now the take-off position or condition of the aircraft in which the platform 40 is displaced from the longitudinal axis of the aircraft and the gyroscopes 20 and 21 mounted thereon are referenced to gravity and a predetermined heading in a conventional manner. The take-off angle will be at some amount up to 90° and consequently the angle A will be essentially the same as the take-off angle. Assuming that the take-off angle is 90° and hence the angle A is 90°, the cosine generators in this instance will have a multiplying factor of zero and the sine generators will have a multiplying factor of one. This will connect the vertical gyro roll signal generator 30 to the rudder axis of the aircraft through the summing resistor 144 and the yaw signal generator 34 of the directional gyroscope 21 to the aileron channel of the autopilot through the summing resistor 114. Similarly the turn control will be connected directly from the turn control signal generator 181 through the sine potentiometer 184 and summing resistor 188 to the rudder channel of the autopilot for direct operation and no energization will be supplied to the directional gyro precession motor. Thus the primary control for the aileron channel will be the yaw axis of the directional gyroscope and the primary control for the rudder axis will be the roll axis of the vertical gyroscope. As explained above, this interchange in the function of the signal generators or associated sensing devices is necessitated by the fact that their position on the platform and their reference position are such that they are incapable of sensing properly the displacement which their normally associated control surface is designed to control. Under take-off conditions as well as landing conditions the airspeed is relatively low and hence the ratio potentiometer substantially reduce the relative magnitudes of the inputs from the rate gyroscopes associated with these respective autopilot channels. Further, the servo balance potentiometers have substantially reduced effect in causing balance of the network, and consequently large control surface action is brought about, as is necessary to secure adequate control at such low airspeeds. As noted above the elevator channel of the autopilot functions in a normal manner, the pitch axis potentiometer of the vertical gyroscope controlling directly displacements of the aircraft in pitch during take-off attitudes, and the rate gyro and servo balance potentiometer signals being automatically adjusted for satisfactory control by the airspeed-responsive ratio potentiometers. As the aircraft leaves the ground on take-off, and starts in a vertical direction, the turnover between vertical flight and level flight is accomplished by operation of the motor 50 associated with the platform 40 to displace the platform relative to the longitudinal axis of the aircraft. Inasmuch as the gimbals of the associated gyroscopes are stable in space due to the gyroscopic rigidity of the spinning mass mounted thereon, the pitch axis potentiometer will be displaced feeding the elevator channel of the autopilot with a pitch signal which will operate the elevator control to displace the aircraft in pitch and follow the displacement of the platform in space such that the spin axis of the vertical gyroscope will be held substantially vertical in space. As the angle A is decreased between 90° and zero, the sine and cosine potentiometers are proportionately modified or their wipers displaced relative to the windings to provide an output from each of the respective devices in proportion to the function of the angle, this proportioning change in the multiplying action of the sine and cosine generators or potentiometers will be in direct proportion to the ability of the associated sensing device to sense properly the displacements of the aircraft about the respective axis which they are associated. Thus at the 45° point in turnover, the roll and yaw axes of the vertical and the directional gyroscopes respectively will have an equal authority or control over both the aileron and rudder channels of the autopilot and the signals from the respective sine and cosine generators will be connected to the respective channels of the autopilot to energize the amplifiers should the aircraft be displaced in roll or yaw and operate the respective servomotor to return the aircraft to the desired attitude. The authority of the directional gyroscope in controlling the aileron servomotor will be appropriately modified as the aircraft approaches the level flight position and at the same time the roll axis of the vertical gyroscope will be increased to full authority on the aileron channel as level flight is approached. Similarly the directional gyroscope through its yaw axis will control directly the rudder channel of the autopilot and the vertical gyro roll axis will diminish authority with respect to this control channel of the autopilot. At the same time, the turn control, should it be used, will be switched or proportioned between direct control of the rudder channel and precession of the gyroscope to a point where at level flight the turn control will operate directly on the directional gyro precession motor for precession type steering. At all points on the turnover, it should be appreciated that it will be possible to utilize the pitch control generator or potentiometer 70 of the elevator channel of the autopilot to control pitch axis displacement of the aircraft.

While I have described my invention in connection with a direct current type of network and associated resulting circuits, it will be appreciated that it is within the scope of the invention to utilize an alternating current type network for each of the control channels of the autopilot and with alternating type resolvers having sine and cosine outputs. Further it should be kept in mind that the present disclosure is intended to be illustrative only and the scope of the invention should be determined only by the appended claims.

I claim as my invention:

1. An automatic pilot for convertible aircraft comprising: a first sensing and signal producing device responsive to yaw displacement of the aircraft, a second sensing and signal producing device responsive to roll and pitch displacement of the aircraft, a platform mounting said first and second devices and pivoted for movement about an axis parallel to the pitch axis of the aircraft, said platform being positioned by means independent of aircraft motion at an angle to the longitudinal axis of the aircraft at landing and take-off and being rotated into substantial alignment with the longitudinal axis of the aircraft during normal level flight, a plurality of sine and cosine potentiometers connected between said platform and said aircraft and operated upon relative displacement between said platform and said aircraft, means connecting a sine and cosine potentiometer to the yaw and the roll signal producing devices respectively and to an aileron servomotor for controlling aileron operation of the aircraft, means connecting a second cosine and a second sine potentiometer to the yaw and roll signal producing devices respectively and to a rudder servomotor controlling rudder operation of the aircraft, motor means for pivoting said platform, means connecting the pitch axis signal generator to a pitch servomotor for controlling the aircraft pitch, and turn control means including a turn signal generator and a third ssine potentiometer for modifying the output of said turn signal generator, said turn control being connected to the rudder servomotor, and a third cosine potentiometer connected to said turn control and to a precession motor for the yaw sensing and signal producing device for modifying the output of said turn control and controlling precession of said yaw sensing device.

2. An automatic pilot for convertible aircraft comprising: a first sensing and signal producing device responsive to yaw displacement of the aircraft, a second sensing and signal producing device responsive to roll displacement of the aircraft, a platform mounting asid first and second devices and pivoted for movement about a platform axis parallel to the pitch axis of the aircraft, said platform being positioned at an angle to the longitudinal axis of the aircraft at landing and take-off and being rotated into substantial alignment with the longitudinal axis of the aircraft during normal level flight, a plurality of non-linear signal multipliers connected between said platform and said aircraft and operated upon relative displacement between said platform and said aircraft, means connecting a pair of said multipliers to said roll and yaw axis signal producing devices and to an aileron servomotor of the automatic pilot, said pair of multipliers modifying the roll and yaw signals from said signal producing devices in proportion to cosine and sine functions respectively of the angular relation between the platform and the longitudinal axis of the aircraft, means connecting a second pair of said multiplying devices to said roll and yaw axis signal producing devices respectively and to a rudder servomotor of said automatic pilot, said second pair of multiplying devices modifying the roll and yaw signals in proportion to sine and cosine functions respectively of the angular relationship between the platform and the longitudinal axis of the aircraft, motor means for pivoting the platform about said platform axis, and means controllably energizing said motor means independent of motion of the aircraft for varying the relationship between said platform and the longitudinal axis of the aircraft.

3. An automatic pilot for convertible aircraft comprising: a directional gyroscope responsive to yaw displacement of the aircraft and having a signal producing device associated therewith, a vertical gyroscope responsive to roll and pitch displacement of the aircraft and having a roll and pitch signal producing device associated therewith, a platform mounting said gyroscopes and pivoted for movement about a platform axis parallel to the pitch axis of the aircraft, said platform being positioned at an angle to the longitudinal axis of the aircraft at landing and take-off and being rotated into substantial alignment with the longitudinal axis of the aircraft during normal level flight, a plurality of non-linear signal multipliers connected between said platform and said aircraft and operated upon relative displacement between said platform and said aircraft, means connecting a pair of said multipliers to said roll and yaw axis signal generators of said vertical and directional gyroscopes respectively and to an aileron servomotor of said automatic pilot, said pair of multipliers modifying the roll and yaw axis signals from said gyroscopes in proportion to the cosine and sine functions respectively of the angular relationship between the platform and the longitudinal axis of the aircraft, means connecting a second pair of said multiplying devices to said roll and yaw axis signal generators of said vertical and directional gyroscopes respectively and to a rudder servomotor of said automatic pilot, said second pair of multiplying devices modifying the roll and yaw signals from said gyroscopes in proportion to sine and cosine functions respectively of the angular relationship between the platform and the longitudinal axis of the aircraft, means connecting the pitch axis signal generator of the vertical gyroscope to a pitch axis servomotor for controlling the operation thereof, coupling circuit means connecting the aileron and rudder servomotors, motor means for pivoting the platform about said platform axis, and means controllably energizing said motor means independent of motion of the aircraft for varying the relationship between said platform and the longitudinal axis of the aircraft.

4. An automatic pilot for convertible aircraft comprising: a first sensing and signal producing device responsive to yaw displacement of the aircraft, a second sensing and signal producing device responsive to roll and pitch displacement of the aircraft, a platform mounting said first and second devices and pivoted for movement about a platform axis parallel to the pitch axis of the aircraft, said platform being positioned by means independent of aircraft motion at an angle to the longitudinal axis of the aircraft at landing and take-off and being rotated into substantial alignment with the longitudinal axis of the aircraft during normal level flight, a plurality of non-linear signal multipliers connected between said platform and said aircraft and operated upon relative displacement between said platform and said aircraft, means connecting a pair of said multipliers to said roll and yaw axis signal producing devices and to an aileron servomotor of the automatic pilot, said pair of multipliers modifying the roll and yaw signals from said signal producing devices in proportion to cosine and sine functions respectively of the angular relation between the platform and the longitudinal axis of the aircraft, means connecting a second pair of said multiplying devices to said roll and yaw axis signal producing devices respectively and to a rudder servomotor of said automatic pilot, said second pair of multiplying devices modifying the roll and yaw signals in proportion to sine and cosine functions respectively of the angular relationship between the platform and the longitudinal axis of the aircraft, motor means for pivoting the platform about said platform axis, and turn control means including a signal generator and a third pair of said multiplying devices, means connecting said turn control signal generator to one of said pair of multiplying devices and to said rudder servomotor for modifying the turn control signal in proportion to a sine function of the angle between the platform and the longitudinal axis of the aircraft and a second of said third pair of multiplying devices to said turn signal generator and a precession motor of the yaw sensing and signal producing device for modifying the turn signal in proportion to a cosine function of the angle between the platform and the longitudinal axis of the aircraft.

5. An automatic pilot for a convertible type aircraft comprising: a pair of sensing devices normally responsive to yaw, roll and pitch of an aircraft and for producing signals in response to displacement of said aircraft about said axes from predetermined positions, means mounting said devices in said aircraft such that they may be displaced about a rotational axis parallel to the pitch axis of the aircraft from a normal relationship relative to the longitudinal axis of the aircraft, servomotor means connected to rudder, aileron and elevator control surfaces of the aircraft for positioning said control surfaces and controlling the flight thereof, means connecting said pitch signal generator to the elevator servomotor for controlling the operation of the same, means connecting the yaw and roll signal generators in circuits to both the aileron and rudder servomotors for controlling the operation of the same, means included in the circuit for the aileron and rudder servomotors for proportioning the authority of said roll and yaw signal generators on the aileron and rudder servomotors in proportion to the angular relationship between the longitudinal axis of the aircraft and the normal relationship of the devices to the aircraft, and means independent of aircraft motion for rotating said devices about said rotational axis relative to the longitudinal axis of the aircraft.

6. An automatic pilot for a convertible type aircraft for controlling the flight thereof from a normally vertical take-off position to a normally horizontal level flight position comprising: a pair of sensing devices normally responsive to displacement of the aircraft about the yaw, roll and pitch axes thereof and for producing signals in response to said displacements from predetermined positions, means mounting said devices in said aircraft such that they may be displaced about a rotational axis parallel to the pitch axis of the aircraft from a normal relationship relative to the longitudinal axis of the aircraft, servomotor means connected to aileron, rudder and elevator control surfaces of the aircraft for positioning said control surfaces and controlling the flight of the aircraft, means connecting said pitch signal generator to the elevator servomotor for controlling the operation of the same, means connecting yaw and roll signal generators in circuits to both the aileron and rudder servomotors for controlling the operation of the same, means included in said circuits for the aileron and rudder servomotors for switching the control of the aileron servomotor from yaw to roll signal generator and the control of the rudder servomotor from said roll to said yaw signal generator as said devices are moved from their displaced positions to their normal relationship with the aircraft during take-off, and means independent of aircraft motion for rotating said devices about said rotational axis relative to the longitudinal axis of the aircraft.

7. An automatic pilot for a convertible type aircraft for controlling the flight thereof from a normally vertical take-off position to a normally horizontal level flight position comprising: a pair of sensing devices normally responsive to displacement of the aircraft about the yaw, roll, and pitch axes thereof and for producing signals in response to said displacements from predetermined positions, means mounting said devices in said aircraft such that they may be displaced about a rotational axis parallel to the pitch axis of the aircraft from a normal relationship relative to the longitudinal axis of the aircraft, servomotor means connected to aileron, rudder and elevator control surfaces of the aircraft for positioning said control surfaces and controlling the flight of the aircraft, means connecting said pitch signal generator to the elevator servomotor for controlling the operation of the same, means connecting yaw and roll signal generators in circuits to both the aileron and rudder servomotors for controlling the operation of the same, means included in the circuits for the aileron and rudder servomotors for varying the amount of yaw and roll signals supplied to each of the aileron and rudder servomotors as a function of the angle measured about said rotational axis between said devices and the longitudinal axis of the aircraft as the aircraft moves between substantially vertical and substantially horizontal flight, and means independent of aircraft motion for rotating said devices about said rotational axis relative to the longitudinal axis of the aircraft.

8. An automatic pilot for a convertible type aircraft for controlling the flight thereof from a normally vertical take-off position to a normally horizontal level flight position comprising: a pair of sensing devices normally responsive to displacement of the aircraft about the yaw, roll and pitch axes thereof and for producing signals in response to said displacements from predetermined positions, means mounting said devices in said aircraft such that they may be displaced about a rotational axis parallel to the pitch axis of the aircraft from a normal relationship relative to the longitudinal axis of the aircraft, servomotor means connected to aileron, rudder and elevator control surfaces of the aircraft for positioning said control surfaces and controlling the flight of the aircraft, means connecting said pitch signal generator to the elevator servomotor for controlling the operation of the same, means connecting yaw and roll signal generators in circuits to both the aileron and rudder servomotors for controlling the operation of the same, means included in said circuits for the aileron and rudder servomotors for switching the control of the aileron servomotor from yaw to roll signal generator and the control of the rudder servomotor from said roll to said yaw signal generator as said devices are moved from their displaced positions to their normal relationship with the aircraft during take-off, means independent of aircraft motion for rotating said devices about said rotational axis relative to the longitudinal axis of the aircraft, turn control means including a signal generator connected to the rudder servomotor and to a yaw precession motor of the yaw sensing device, and means for switching the turn control from the rudder servomotor to the yaw sensing device as the aircraft moves between substantially vertical and substantially horizontal flight.

9. An automatic pilot for a convertible type aircraft for controlling the flight thereof from a normally vertical take-off position to a normally horizontal level flight position comprising: a pair of sensing devices normally responsive to displacement of the aircraft about the yaw, roll, and pitch axes thereof and for producing signals in response to said displacements from predetermined positions, means mounting said devices in said aircraft such that they may be displaced about a rotational axis parallel to the pitch axis of the aircraft from a normal relationship relative to the longitudinal axis of the aircraft, servomotor means connected to aileron, rudder and elevator control surfaces of the aircraft for positioning said control surfaces and controlling the flight of the aircraft, means connecting said pitch signal generator to the elevator servomotor for controlling the operation of the same, means connecting yaw and roll signal generators in circuits to both the aileron and rudder servomotors for controlling the operation of the same, means included in the circuits for the aileron and rudder servomotors for varying the amount of yaw and roll signals supplied to each of the aileron and rudder servomotors as a function of the angle measured about said rotational axis between said devices and the longitudinal axis of the aircraft as the aircraft moves between substantially vertical and substantially horizontal flight, means independent of aircraft motion for rotating said devices about said rotational axis relative to the longitudinal axis of the aircraft, turn control means including a signal generator connected to the rudder servomotor and to a yaw precession motor of the yaw sensing device, and means for varying the authority of said turn control between direct control of the rudder servomotor to precession steering of the yaw sensing device as said aircraft moves between vertical and substantially horizontal flight.

10. An automatic pilot for convertible aircraft having roll, pitch and yaw axes comprising: a platform; means pivotally mounting said platform for rotation about an axis parallel to the pitch axis of the aircraft; first sensing and signal producing means mounted on said platform and responsive to yaw displacement of said platform; second sensing and signal producing means mounted on said platform responsive to roll and pitch displacement of said platform; motor means connected to said platform; means controllably energizing said motor means, said motor means when energized rotating said platform about said platform rotational axis, said platform being positioned at a substantial angle to the roll axis of the aircraft at take-off, said motor means being energized by said energizing means subsequent to take-off so as to rotate said platform about said platform rotational axis to a position wherein said platform is substantially aligned with the roll axis of the aircraft, said pitch sensing and signal producing means on said platform sensing said rotation of said platform about said platform rotational axis and producing a signal, means connecting said pitch sensing and signal producing means to means effective to change the pitch attitude of said aircraft so that as said platform is rotated about said platform rotational axis said aircraft will be displaced in the same sense about its pitch axis thus maintaining said platform substantially stabilized about its rotational axis; a plurality of sine and cosine multipliers connected between said platform and said aircraft and operated upon relative displacement between said platform and said aircraft; means connecting a sine and cosine multiplier to the yaw and roll signal producing means respectively and to an aileron servomotor for controlling aileron operation of the aircraft; and means connecting a second cosine and a second sine multiplier to the yaw and roll signal producing means respectively and to a rudder servomotor controlling rudder operation of the aircraft.

11. An automatic pilot for convertible aircraft having roll, pitch and yaw axes comprising: a platform; means pivotally mounting said platform for rotation about an axis parallel to the pitch axis of the aircraft; sensing and signal producing means mounted on said platform and responsive to yaw, roll, and pitch displacements of said platform; motor means connected to said platform; means controllably energizing said motor means, said motor means when energized rotating said platform about said platform rotational axis, said platform being positioned at a substantial angle to the roll axis of the aircraft at take-off, said motor means being energized by said energizing means subsequent to take-off so as to rotate said platform about said platform rotational axis to a position wherein said platform is substantially aligned with the roll axis of the aircraft, said pitch sensing and signal producing means on said platform sensing said rotation of said platform about said platform rotational axis and producing a signal, means connecting said pitch sensing and signal producing means to means effective to change the pitch attitude of said aircraft so that as said platform is rotated about said platform rotational axis said aircraft will be displaced in the same sense about its pitch axis thus maintaining said platform substantially stabilized about its rotational axis; a plurality of sine and cosine multipliers connected between said platform and said aircraft and operated upon relative displacement between said platform and said aircraft; means connecting a sine and cosine multipliers to the yaw and roll signal producing means respectively and to an aileron servometer for controlling aileron operation of the aircraft; and means connecting a second cosine and a second sine multipliers to the yaw and roll signal producing means respectively and to a rudder servomotor controlling rudder operation of the aircraft.

References Cited in the file of this patent

UNITED STATES PATENTS

| | | |
|---|---|---|
| 2,595,309 | Slater | May 6, 1952 |
| 2,623,714 | Slater | Dec. 30, 1952 |
| 2,649,264 | Slater et al. | Aug. 18, 1953 |
| 2,771,258 | Johnson | Nov. 20, 1956 |

OTHER REFERENCES

Mynall: Electrical Analogue Computing-Electronic Engineering, August 1947, pages 259–262 (photo in 244–77B).